United States Patent
Vo et al.

(10) Patent No.: US 9,222,344 B2
(45) Date of Patent: Dec. 29, 2015

(54) METHODS FOR STIMULATION AND STABILIZATION OF SUBTERRANEAN FORMATIONS

(71) Applicant: Halliburton Energy Services, Inc., Houston, TX (US)

(72) Inventors: Loan K. Vo, Houston, TX (US); Philip D. Nguyen, Houston, TX (US); Christopher R. Parton, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 245 days.

(21) Appl. No.: 13/898,653

(22) Filed: May 21, 2013

(65) Prior Publication Data

US 2014/0345870 A1  Nov. 27, 2014

(51) Int. Cl.
| | |
|---|---|
| *E21B 43/26* | (2006.01) |
| *C09K 8/56* | (2006.01) |
| *C09K 8/528* | (2006.01) |
| *C09K 8/60* | (2006.01) |
| *C09K 8/74* | (2006.01) |
| *C09K 8/84* | (2006.01) |

(52) U.S. Cl.
CPC ............... *E21B 43/26* (2013.01); *C09K 8/528* (2013.01); *C09K 8/56* (2013.01); *C09K 8/602* (2013.01); *C09K 8/74* (2013.01); *C09K 8/845* (2013.01); *C09K 2208/32* (2013.01)

(58) Field of Classification Search
None
See application file for complete search history.

(56) References Cited

U.S. PATENT DOCUMENTS

| | | | | |
|---|---|---|---|---|
| 2,793,998 | A | * | 5/1957 | Brainerd, Jr. et al. ......... 507/218 |
| 4,120,923 | A | | 10/1978 | Kloker et al. |
| 4,151,879 | A | | 5/1979 | Thomas |
| 4,518,040 | A | * | 5/1985 | Middleton .................... 166/307 |
| 5,222,556 | A | | 6/1993 | Donlon et al. |
| 6,311,773 | B1 | | 11/2001 | Todd et al. |
| 6,439,309 | B1 | | 8/2002 | Matherly et al. |
| 7,040,403 | B2 | | 5/2006 | Nguyen et al. |
| 7,392,847 | B2 | | 7/2008 | Gatlin et al. |
| 7,690,431 | B2 | | 4/2010 | Nguyen et al. |
| 7,819,192 | B2 | * | 10/2010 | Weaver et al. ................ 166/292 |
| 7,956,017 | B2 | | 6/2011 | Gatlin et al. |
| 2004/0168830 | A1 | | 9/2004 | Reddy et al. |
| 2005/0061509 | A1 | * | 3/2005 | Nguyen ........................ 166/307 |
| 2007/0187097 | A1 | * | 8/2007 | Weaver et al. ............. 166/280.2 |
| 2007/0289781 | A1 | * | 12/2007 | Rickman et al. ................. 175/65 |
| 2009/0298720 | A1 | * | 12/2009 | Nguyen et al. ................. 507/204 |
| 2010/0270023 | A1 | * | 10/2010 | Dusterhoft et al. ......... 166/308.6 |
| 2012/0205107 | A1 | * | 8/2012 | Rickman et al. ............. 166/295 |
| 2013/0000931 | A1 | | 1/2013 | Wroolie et al. |
| 2013/0014951 | A1 | | 1/2013 | Fitzpatrick |

FOREIGN PATENT DOCUMENTS

WO     2014189820 A1    11/2014

OTHER PUBLICATIONS

Vo, "Development and Applications of an Aqueouas-Based Surface Modification Agent," SPE 165172, currently unpublished, not to publish until Jun. 5, 2013, Jun. 2013.
International Search Report and Written Opinion for PCT/US2014/038549 dated Sep. 16, 2014.

* cited by examiner

*Primary Examiner* — Angela M DiTrani
*Assistant Examiner* — Anuradha Ahuja
(74) *Attorney, Agent, or Firm* — McDermott Will & Emery LLP; Holly Soehnge

(57) ABSTRACT

Methods treating a subterranean formation including providing a one-step acidizing treatment fluid comprising a first aqueous base fluid, a formation stimulation agent, and a stabilizing emulsion, wherein the stabilizing emulsion is an aqueous external emulsion comprising a second aqueous base fluid, a surfactant, and an aqueous-based surface modification agent; introducing the one-step acidizing treatment fluid into the subterranean formation; contacting the formation stimulation agent with the subterranean formation so as to acidize the subterranean formation and create conductive channels therethrough; and contacting the stabilizing emulsion with the subterranean formation so as to release the aqueous-based surface modification agent and stabilize unconsolidated formation particulates therein.

19 Claims, No Drawings

METHODS FOR STIMULATION AND STABILIZATION OF SUBTERRANEAN FORMATIONS

BACKGROUND

The present invention relates to methods for stimulation and stabilization of subterranean formations.

Subterranean formations penetrated by wellbores are often treated with acidizing treatment fluids to stimulate the production of hydrocarbons therefrom. One such acidizing treatment involves the introduction of an acidizing treatment fluid into a subterranean formation such that the acidizing treatment fluid contacts the subterranean formation or a desired portion of a subterranean formation (e.g., a proppant pack in a propped fracture). The acidizing treatment fluid reacts with acid soluble materials contained in the subterranean formation (or contained in the proppant pack) thereby etching channels into the subterranean formation and increasing the permeability of the formation. Another acidizing treatment, termed "fracture-acidizing," involves fracturing a subterranean formation using an acidizing treatment fluid such that the acidizing treatment fluid etches channels in the faces of the formed fractures thereby creating flow-paths for the production of hydrocarbons. Acidizing treatment fluids may also enlarge pore spaces within a subterranean formation and within fracture faces. Additionally, acidizing treatment fluids may be used to remove materials clogging the interstitial spaces in proppant packs used to prop fractures open, thereby restoring the conductivity of a proppant pack.

Subterranean formations treated with acidizing treatment fluids may be used to initially stimulate hydrocarbon production or to restore hydrocarbon production in a formation exhibiting reduced production due to plugging of conductivity channels with unconsolidated particulates in the formation, such as formation fines or scale deposits. However, often the production capacity of an acid treated formation is reduced prematurely due to continued plugging of the acid-formed channels with unconsolidated particulates. These unconsolidated particulates may invade the channels in a formation or in a proppant pack because there is no cohesion between the grains, or the grains and the formation, to anchor the unconsolidated particulates in place and prevent them from plugging production channels. Thus, a one-step acidizing treatment fluid capable of both etching channels in a subterranean formation, including in fracture faces, or in a proppant pack to allow hydrocarbons to flow therethrough and stabilizing unconsolidated particulates may be of benefit to one of ordinary skill in the art.

SUMMARY OF THE INVENTION

The present invention relates to methods for stimulation and stabilization of subterranean formations.

In some embodiments, the present invention provides a method of treating a subterranean formation comprising: providing a one-step acidizing treatment fluid comprising a first aqueous base fluid, a formation stimulation agent, and a stabilizing emulsion, wherein the stabilizing emulsion is an aqueous external emulsion comprising a second aqueous base fluid, a surfactant, and an aqueous-based surface modification agent; introducing the one-step acidizing treatment fluid into the subterranean formation; contacting the formation stimulation agent with the subterranean formation so as to acidize the subterranean formation and create conductive channels therethrough; and contacting the stabilizing emulsion with the subterranean formation so as to release the aqueous-based surface modification agent and stabilize unconsolidated formation particulates therein.

In other embodiments, the present invention provides a method of treating a proppant pack in a fracture in a subterranean formation comprising: providing a one-step acidizing treatment fluid comprising a first aqueous base fluid, a formation stimulation agent, and a stabilizing emulsion, wherein the stabilizing emulsion is an aqueous external emulsion comprising a second aqueous base fluid, a surfactant, and an aqueous-based surface modification agent; introducing the one-step acidizing treatment fluid into the subterranean formation; contacting the formation stimulation agent with the proppant pack in the fracture so as to acidize the proppant pack and create conductive channels therethrough; and contacting the stabilizing emulsion with the subterranean formation adjacent to the proppant pack or the proppant pack in the fracture so as to release the aqueous-based surface modification agent and stabilize unconsolidated formation particulates adjacent to or within the proppant pack.

In still other embodiments, the present invention provides a method of acid fracturing a subterranean formation comprising: providing a one-step acidizing treatment fluid comprising a first aqueous base fluid, a formation stimulation agent, and a stabilizing emulsion, wherein the stabilizing emulsion is an aqueous external emulsion comprising a second aqueous base fluid, a surfactant, and an aqueous-based surface modification agent; introducing the one-step acidizing treatment fluid into the subterranean formation at a rate and pressure sufficient to create or enhance at least one fracture therein; contacting the formation stimulation agent with the subterranean formation adjacent to or within the fracture so as to acidize the subterranean formation and create conductive channels therethrough; and contacting the stabilizing emulsion with the subterranean formation adjacent to or within the fracture so as to release the aqueous-based surface modification agent and stabilize unconsolidated formation particulates therein.

The features and advantages of the present invention will be readily apparent to those skilled in the art upon a reading of the description of the preferred embodiments that follows.

DETAILED DESCRIPTION

The present invention relates to methods for stimulation and stabilization of subterranean formations.

The methods of the present invention employ a one-step acidizing treatment fluid capable of stimulating a subterranean formation and also stabilizing unconsolidated particulates, such as formation fines, scale deposits, and the like. Specifically, the methods of the present invention employ a one-step acidizing treatment fluid comprising a formation stimulation agent and an aqueous-based surface modification agent ("ASMA"), which may be included within a stabilizing emulsion such that it is "aqueous-based," in the same fluid. The formation stimulation agent is capable of acidizing a subterranean formation, including fracture faces, and/or a proppant pack within the subterranean formation so as to etch channels therein through which hydrocarbons to flow and so as to dissolved plugged pore spaces. The ASMA is capable of stabilizing unconsolidated particulates within the subterranean formation, thus preventing or reducing their invasion into the channels created by the formation stimulation agent. The ASMA may form a hydrophobic film on the surface the formation or proppant pack, additionally stabilizing soft formations, inhibiting or reducing water invasion, and/or minimizing damage attributed to formation spalling. Accordingly, the hydrophobic film from the ASMA may result when the ASMA is non-aqueous, but is termed an "ASMA" because it is placed and delivered within the aqueous external emulsions of the present disclosure. The ASMA of the present invention may also beneficially reduce damage and cleaning difficulties related to operational equipment, which is often attributed to traditional surface modification agents due to their extreme tackiness and insolubility.

In some embodiments, the present invention provides a method of treating a subterranean formation comprising introducing into the subterranean formation a one-step acidizing treatment fluid comprising a first aqueous base fluid, a formation stimulation agent, and a stabilizing emulsion. The stabilizing emulsion is an aqueous external emulsion comprising a second aqueous base fluid, a surfactant, and an ASMA. The formation stimulation agent is contacted with the subterranean formation so as to acidize the formation and etch conductive channels therethrough. The stabilizing emulsion is contacted with the subterranean formation so as to release the ASMA and stabilize, or anchor in place, unconsolidated particles, thus preventing them from entering the newly formed channels within the formation.

In some embodiments, the one-step acidizing treatment fluid is introduced into the subterranean formation at a rate and pressure sufficient to create or enhance at least one fracture therein. The formation stimulation agent is contacted with the subterranean formation adjacent to or within the fracture so as to acidize channels therethrough. The stabilizing emulsion is contacted with the subterranean formation adjacent to or within the fracture (e.g., the face of the fracture) so as to release the ASMA and stabilize, or anchor, unconsolidated particulates in place, thus preventing them from entering the newly formed channels adjacent to or within the fracture.

In other embodiments, the one-step acidizing treatment fluid is introduced into a subterranean formation having a proppant pack propping a fracture already therein. As used herein, the term "proppant pack" refers to proppant in fractures, gravel packs, frac-packs, and the like used to prop open fractures within a subterranean formation. The formation stimulation agent is contacted with the proppant pack so as to acidize the proppant pack, thereby removing acid soluble materials (e.g., formation fines or scale deposits) plugging the interstitial spaces between the proppant within the proppant pack to restore conductivity to the proppant pack. The stabilizing emulsion is contacted with the subterranean formation adjacent to the proppant pack or the proppant pack itself so as to release the ASMA and stabilize, or anchor in place, unconsolidated particulates, thus preventing them from migrating and entering the newly formed channels within the proppant pack.

The formation stimulation agent of the present invention may be any substance capable of acidizing a subterranean formation, including fracture faces, or a proppant pack so as to form channels therethrough which allow the flow of hydrocarbons. Suitable formation stimulation agents include, but are not limited to, hydrochloric acid; hydrofluoric acid; citric acid; formic acid; L-glutamic acid; N,N,-diacetic acid; ethylenediaminetetraacetic acid; hydroxyethylethylenediaminetriacetic acid; nitrilotriacetic acid; ethanoldiglycine disodium salt; diethylenetriaminpentaacetic acid; propylenediaminetetraacetic acid; ethylenediamindi(o-hydroxyphenylacetic) acid; a sodium salt of L-glutamic acid; a sodium salt of N,N,-diacetic acid; a sodium salt of ethylenediaminetetraacetic acid; a sodium salt of hydroxyethylethylenediaminetriacetic acid; a sodium salt of nitrilotriacetic acid; a sodium salt of ethanoldiglycine disodium salt; a sodium salt of diethylenetriaminpentaacetic acid; a sodium salt of propylenediaminetetraacetic acid; a sodium salt of ethylenediaminedi(o-hydroxyphenylacetic) acid; a potassium salt of L-glutamic acid; a potassium salt of N,N,-diacetic acid; a potassium salt of ethylenediaminetetraacetic acid; a potassium salt of hydroxyethylethylenediaminetriacetic acid; a potassium salt of nitrilotriacetic acid; a potassium salt of ethanoldiglycine disodium salt; a potassium salt of diethylenetriaminpentaacetic acid; a potassium salt of propylenediaminetetraacetic acid; a potassium salt of ethylenediaminedi(o-hydroxyphenylacetic) acid; a dicarboxymethyl glutamic acid tetrasodium salt; a trisodium salt of methylglycinediacetic acid; any derivative thereof; and any combination thereof.

The formation stimulation agent of the present invention may be present in any concentration in the one-step acidizing treatment fluid capable of etching channels through a subterranean formation or proppant pack without adversely affecting the particular subterranean operation being performed. In some embodiments, the formation stimulation agent of the present invention may be present in the range of from about 0.1% to about 20% by weight of the one-step acidizing treatment fluid. In preferred embodiments, the formation stimulation agent of the present invention may be present in the range of from about 1% to about 10% by weight of the one-step acidizing treatment fluid.

The stabilizing emulsion of the present invention is an aqueous external emulsion comprising a second aqueous base fluid, a surfactant, and an ASMA. The ASMA may render one or more particulates within the subterranean formation tacky, including unconsolidated particulates, proppant, and the like, such as by forming a coating thereon. As used herein, the term "tacky" in all its forms, refers to a substance that is somewhat sticky to the touch. When the ASMA imparts tackiness to unconsolidated particulates, it may serve to immobilize and prevent them from invading channels etched by the formation stimulation agent in the subterranean formation, fractures, or proppant packs, thus, ensuring the conductivity of the formation. The tackiness may also serve to aggregate various unconsolidated particulates together, thereby preventing them from entering somewhat tight spaces, as are typically characteristic of the channels formed by use of the formation stimulation agent. When the ASMA imparts tackiness to proppant, it may serve to hinder the tight packing of individual proppant within a proppant pack, resulting in a proppant pack possessing more void spaces and, thus, increased permeability and conductivity compared to proppant lacking the tackiness provided by the ASMA.

Suitable ASMA's for use in the present invention may be any compound that is capable of imparting the tackifying qualities to particulates during a subterranean operation. The ASMA's of the present invention may be liquids or in solution at the temperature of the subterranean formation such that they are, by themselves, nonhardening under reservoir conditions. Suitable examples of compounds for use as ASMA's of the present invention include, but are not limited to, a polyamide; a polyester; a polycarbonate; a polycarbamate; a natural resin (e.g., plant producing resins, such as terpene compounds or gum resins, insect producing resins, such as shellacs, and the like); a zeta-potential reducing agent; and any combination thereof. An example of a suitable commercially available ASMA for use in the one-step acidizing treatment fluids of the present invention includes, but is not limited to, SANDWEDGE® ABC, available from Halliburton Energy Services, Inc. In some embodiments, the ASMA of the present invention is present in an amount in the range of from about 0.01% to about 10% by weight of the one-step acidizing treatment fluid. In other embodiments, the ASMA of the present invention is present in an amount in the range of from about 0.1% to about 5% by weight of the one-step acidizing treatment fluid.

The polyamides for use as the ASMA of the present invention may be synthetic or natural. The polyamides may be formed, for example, by a condensation reaction product comprising of a polyacid and a polyamine. Such polyamide compounds may include combinations of dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Combinations of these may be suitable as well. The polyamides for use in the present invention may be a silyl-modified polyamide compound. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309, the entire disclosure of which is herein incorporated by reference.

In some embodiments, the ASMA of the present invention may be a polyester. Suitable polyesters may be formed by the reaction of a polyhydric alcohol (e.g., dihydric or higher) and a polybasic acid (e.g., dibasic or higher). Suitable polyhydric alcohols include, but are not limited to, a glycol; ethylene glycol; diethylene glycol; triethylene glycol; tetraethylene glycol; polyethylene glycol; dipropylene glycol; polypropylene glycol; dibutylene glycol; polybutylene glycol; 1,2-propylene glycol; 1,3-propylene glycol; 1,4-butylene glycol; 2,3-butylene glycol; 1,6-hexanediol; 1,8-octanediol; neopentyl glycol; 1,4-bis-hydroxymethylcyclohexane; 2-methyl-1, 3-propanediol; glycerol; trimethylolpropane; 1,2,6-hexanetriol; 1,2,4-butanetriol; trimethylolethane; pentaerythritol; quinitol; mannitol; sorbitol; methylglycoside; and any combination thereof. Suitable polybasic acids may include, but are not limited to, succinic acid; adipic acid; suberic acid; azelaic acid; sebacic acid; phthalic acid, isophthalic acid; trimellitic acid; phthalic anhydride; tetrahydrophthalic anhydride; hexahydrophthalic anhydride; tetrachlorophthalic anhydride; endomethylenetetrahydrophthalic anhydride; glutaric anhydride; maleic acid; maleic anhydride; fumaric acid; a polymeric fatty acid (e.g., oleic acid); and any combination thereof.

The polycarbonates for use as the ASMA of the present invention are characterized as having multiple carbonate groups. The polycarbonates may be formed by the reaction product of a polyol and a phosgene. The polyol may be linear or branched and suitable examples include, but are not limited to, bisphenol A; ethylene glycol; diethylene glycol; triethylene glycol; tetraethylene glycol 1,3-propanediol; 1-4-butanediol; 1,5-pentanediol; 1-6-hexanediol; 1,2-propanediol; 1,2-butanediol; 2,3-butanediol; 1,3-butanediol; 1,2-pentanediol; ethohexadiol; p-menthane-3,8-diol; 2-methyl-2,4-pentanediol; and any combination thereof.

The polycarbamates for use as the ASMA of the present invention are derived from carbamic acid, and may include polycarbamate esters. The polycarbamates may be formed by the reaction product of a polyol and carbamic acid. The polyol may be linear or branched and suitable examples include, but are not limited to, bisphenol A; ethylene glycol; diethylene glycol; triethylene glycol; tetraethylene glycol 1,3-propanediol; 1-4-butanediol; 1,5-pentanediol; 1-6-hexanediol; 1,2-propanediol; 1,2-butanediol; 2,3-butanediol; 1,3-butanediol; 1,2-pentanediol; ethohexadiol; p-menthane-3,8-diol; 2-methyl-2,4-pentanediol; and any combination thereof. Additionally, the reaction may be performed in the presence of a tertiary amine.

In some embodiments, the ASMA of the present invention may be a zeta-potential reducing agent. The zeta-potential reducing agents suitable for use in the present invention may be formed, for example, by a reaction of an amine and a phosphate ester, such that the zeta-potential reducing agent is capable of altering the zeta potential of a surface. Suitable zeta-potential reducing agents and their methods of use can be found in U.S. Pat. Nos. 7,392,847 and 7,956,017, the entire disclosures of which are hereby incorporated by reference.

Suitable amines for use in producing the zeta-potential reducing agents of the present invention include, but are not limited to, any amine that is capable of reacting with a suitable phosphate ester to form a composition that alters the zeta potential of a surface. Exemplary examples of such amines include, but are not limited to, any amine of the general formula $R_1,R_2NH$ or mixtures or combinations thereof, where $R_1$ and $R_2$ are independently a hydrogen atom or a carbyl group having between about 1 and 40 carbon atoms and the required hydrogen atoms to satisfy the valence and where one or more of the carbon atoms can be replaced by one or more hetero atoms selected from the group consisting of boron; nitrogen; oxygen; phosphorus; sulfur; mixture thereof; or combinations thereof, and where one or more of the hydrogen atoms can be replaced by one or more single valence atoms selected from the group consisting of fluorine; chlorine; bromine; iodine; mixtures thereof; or combinations thereof. Exemplary examples of amines suitable for use in this invention include, but are not limited to, aniline and alkyl aniline or mixtures of alkyl aniline; pyridine and alkyl pyridine or mixtures of alkyl pyridine; pyrrole and alkyl pyrrole or mixtures of alkyl pyrrole; piperidine and alkyl piperidine or mixtures of alkyl piperidine; pyrrolidine and alkyl pyrrolidine or mixtures of alkyl pyrrolidine; indole and alkyl indole or mixture of alkyl indole; imidazole and alkyl imidazole or mixtures of alkyl imidazole; quinoline and alkyl quinoline or mixture of alkyl quinolone; isoquinoline and alkyl isoquinoline or mixture of alkyl isoquinoline; pyrazine and alkyl pyrazine or mixture of alkyl pyrazine; quinoxaline and alkyl quinoxaline or mixture of alkyl quinoxaline; acridine and alkyl acridine or mixture of alkyl acridine; pyrimidine and alkyl pyrimidine or mixture of alkyl pyrimidine; quinazoline and alkyl quinazoline or mixture of alkyl quinazoline; mixtures thereof; or combinations thereof.

Suitable phosphate esters for use in producing the zeta-potential reducing agents of the present invention include, but are not limited to, any phosphate ester that is capable of reacting with a suitable amine to form a composition that alters the zeta potential of a surface. Exemplary examples of such phosphate esters include, but are not limited to, any phosphate esters of the general formula $P(O)(OR^3)(OR^4)(OR^5)$ or mixture or combinations thereof, where $R^3$, $R^4$, and $OR^5$ are independently a hydrogen atom or a carbyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Exemplary examples of phosphate esters include, but are not limited to, phosphate ester of alkanols having the general formula $P(O)(OH)_x(OR^6)_y$, where $x+y=3$ and are independently a hydrogen atom or a carbyl group having between about 1 and 40 carbon atoms and the required hydrogen atoms to satisfy the valence and where one or more of the carbon atoms can be replaced by one or more hetero atoms selected from the group consisting of boron; nitrogen; oxygen; phosphorus; sulfur; mixtures thereof; or combinations thereof and where one or more of the hydrogen atoms can be replaced by one or more single valence atoms selected from the group consisting of fluorine; chlorine; bromine; iodine; mixtures thereof; or combinations thereof such as ethoxy phosphate; propoxyl phosphate; or higher alkoxy phosphates; mixtures thereof; or combinations thereof. Other exemplary examples of phosphate esters include, but are not limited to, phosphate esters of alkanol amines having the general formula $N[R^7OP(O)(OH)_2]_3$ where $R^7$ is a carbenyl group having between about 1 and 40 carbon atoms and the required hydrogen atoms to satisfy the valence and where one or more of the carbon atoms can be replaced by one or more hetero atoms selected from the group consisting of boron; nitrogen; oxygen; phosphorus; sulfur; mixtures thereof; or combinations thereof and where one or more of the hydrogen atoms can be replaced by one or more single valence atoms selected from the group consisting of fluorine; chlorine; bromine; iodine; mixtures thereof; or combinations thereof, including the tri-phosphate ester of tri-ethanol amine or mixtures or combinations thereof. Other exemplary examples of phosphate esters include, but are not limited to, phosphate esters of hydroxylated aromatics such as phosphate esters of alkylated phenols such as nonylphenyl phosphate ester or phenolic phosphate esters. Other exemplary examples of phosphate esters include, but are not limited to, phosphate esters of diols and polyols such as phosphate esters of ethylene glycol, propylene glycol, or higher glycolic structures. Other exemplary phosphate esters include, but are not limited to, any phosphate ester than can react with an amine and coated on to a substrate forms a deformable coating enhancing the aggregating potential of the substrate.

The surfactant for use in the stabilizing emulsion of the present invention may serve to aid in stabilizing the emulsion. The surfactant may also facilitate the coating of the hydrophobic film formed by the ASMA onto the formation or proppant pack. Any surfactant compatible with the ASMA may be used in the stabilizing emulsion. Such surfactants include, but are not limited to, an alkyl phosphonate surfactant (e.g., a C12-C22 alkyl phosphonate surfactant); an ethoxylated nonyl phenol phosphate ester; one or more cationic surfactants; one or more nonionic surfactants; and any combination thereof. Examples of such surfactant combinations are described in U.S. Pat. No. 6,311,773, the entire disclosure of which is incorporated herein by reference. An example of a suitable commercially available surfactant for use in the stabilizing emulsion of the present invention is FDP-S1041, available from Halliburton Energy Services, Inc. The surfactant or surfactants that may be present in an amount in the range of from about 0.01% to about 10% by weight of the stabilizing emulsion.

In some embodiments of the present invention, the one-step acidizing treatment fluid of the present invention may further comprise an additive selected from the group consisting of a corrosion inhibitor; a scale inhibitor; and any combination thereof.

Any aqueous base fluid may be used as the first or second aqueous base fluids for use in the present invention. The first or second aqueous base fluids may be identical or may be different fluid types. One of ordinary skill in the art, with the benefit of this disclosure, will recognize when it may be of benefit to use the same or different fluids as the first and/or second aqueous base fluids of the present invention. Factors that may affect whether or not to use the same fluid include, for example, fluid availability, ease of handling, the type of ASMA used, the type of subterranean operations being performed, and the like. Suitable aqueous base fluids for use as the first and/or second aqueous base fluids of the present invention include, but are not limited to, fresh water; saltwater (e.g., water containing one or more salts dissolved therein); brine (e.g., saturated salt water); seawater; and any combination thereof. Generally, the water may be from any source, provided that it does not contain components that might adversely affect the stability and/or performance of the one-step acidizing treatment fluids of the present invention. In certain embodiments, the pH of the aqueous base fluid may be adjusted (e.g., by a buffer or other pH adjusting agent), among other purposes, effect the viscosity of the one-step acidizing treatment fluid. One of ordinary skill in the art, with the benefit of this disclosure, will recognize when such pH adjustments are appropriate. In some embodiments, the pH range may range from about 4 to about 11.

In certain embodiments, the formation stimulation agent is first contacted with a proppant pack in a fracture so as to acidize the proppant pack and create conductive channels therethrough and thereafter the stabilizing emulsion is contacted with the proppant pack or the subterranean formation adjacent to the proppant pack so as to release the aqueous-based surface modification agent and stabilize unconsolidated formation particulates adjacent to or within the proppant pack. Materials that may form the proppant pack of the present invention may include, but are not limited to sand; bauxite; ceramic materials; glass materials; polymer materials; polytetrafluoroethylene materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; and combinations thereof. Suitable composite particulates may comprise a binder and a filler material wherein suitable filler materials may include, but are not limited to, silica; alumina; fumed carbon; carbon black; graphite; mica; titanium dioxide; meta-silicate; calcium silicate; kaolin; talc; zirconia; boron; fly ash; hollow glass microspheres; solid glass; and any combination thereof. The mean proppant size generally may range from about 2 mesh to about 400 mesh on the U.S. Sieve Series; however, in certain circumstances, other mean proppant sizes may be desired and will be entirely suitable for practice of the present invention. In particular embodiments, preferred mean proppant size distribution ranges are one or more of 6/12, 8/16, 12/20, 16/30, 20/40, 30/50, 40/60, 40/70, or 50/70 mesh. It should be understood that the term "proppant," as used in this disclosure, includes all known shapes of materials, including substantially spherical materials; fibrous materials; polygonal materials (such as cubic materials); and any combination thereof.

To facilitate a better understanding of the present invention, the following examples of preferred or representative embodiments are given. In no way should the following examples be read to limit, or to define, the scope of the invention.

EXAMPLE 1

In this example, the stability of the one-step acidizing treatment fluid of the present invention was evaluated at varying temperatures and time points. A one-step acidizing treatment fluid was prepared in accordance with the teachings of the present invention comprising a water base fluid, 10% hydrochloric acid formation stimulation agent, and a stabilizing emulsion comprising a water base fluid and 5% SAND-WEDGE® ABC aqueous-based surface modification agent. The one-step acidizing treatment fluid further comprised 1% FDP-S1041 surfactant to aid in stabilizing the emulsion. The stability of the one-step acidizing treatment fluid was evaluated after an elapsed time of 20 minutes and 1 hour at room temperature, 65.6° C. (150° F.), and 93.3° C. (200° F.). At both time points and all temperatures, the ASMA remained in a stable emulsion despite being in an acidic environment.

EXAMPLE 2

In this example, the stability of the one-step acidizing treatment fluid of the present invention was evaluated at varying temperatures after 1 hour. A one-step acidizing treatment fluid was prepared in accordance with the teachings of the present invention comprising a water base fluid, 15% methylglycinediacetic acid formation stimulation agent, and a stabilizing emulsion comprising a water base fluid and 5% SANDWEDGE® ABC aqueous-based surface modification agent. The one-step acidizing treatment fluid further comprised 1% FDP-S1041 surfactant to aid in stabilizing the emulsion. The stability of the one-step acidizing treatment fluid was evaluated after an elapsed time of 1 hour at room temperature, 65.6° C. (150° F.), and 93.3° C. (200° F.). After 1 hour and at all temperatures, the ASMA remained in a stable emulsion despite being in an acidic environment.

EXAMPLE 3

In this example, the stability of the one-step acidizing treatment fluid of the present invention was evaluated at varying temperatures after 1 hour. A one-step acidizing treatment fluid was prepared in accordance with the teachings of the present invention comprising a water base fluid, 15% methylglycinediacetic acid formation stimulation agent, and a stabilizing emulsion comprising a water base fluid and 5% SANDWEDGE® ABC aqueous-based surface modification agent. The one-step acidizing treatment fluid further comprised 1.5% FDP-S1041 surfactant to aid in stabilizing the emulsion. The stability of the one-step acidizing treatment fluid was evaluated after an elapsed time of 1 hour at room temperature, 65.6° C. (150° F.), and 93.3° C. (200° F.). After 1 hour and at all temperatures, the ASMA remained in a stable emulsion despite being in an acidic environment.

EXAMPLE 4

In this example, the stability of the one-step acidizing treatment fluid of the present invention was evaluated at varying temperatures after 1 hour. A one-step acidizing treatment fluid was prepared in accordance with the teachings of the present invention comprising a water base fluid, 15% methylglycinediacetic acid formation stimulation agent, and a stabilizing emulsion comprising a water base fluid and 5% SANDWEDGE® ABC aqueous-based surface modification agent. The one-step acidizing treatment fluid further comprised 0.5% FDP-S1041 surfactant to aid in stabilizing the emulsion. The stability of the one-step acidizing treatment fluid was evaluated after an elapsed time of 1 hour at room temperature, 65.6° C. (150° F.), and 93.3° C. (200° F.). After 1 hour and at all temperatures, the ASMA remained in a stable emulsion despite being in an acidic environment.

EXAMPLE 5

In this example, the effect of migration of unconsolidated particulates in the presence of the one-step acidizing treatment fluids of the present invention was evaluated. Brazos River Sand ("BRS") having a particulate size of less than 200 mesh was used to simulate unconsolidated particulates and Brady 20/40 mesh sand was used to simulate a proppant pack. Twenty-two grams of the BRS and 44 grams of the Brady 20/40 mesh sand was mixed together and packed into a 12.7 cm (5 inch) long and 3.49 cm (1.375 inch) diameter brass cylinder, sandwiched between 66 grams of Brady 20/40 mesh sand on top and 66 grams of Brady 40/70 mesh sand on bottom. Two sand columns were prepared, one for use as a control and the other for experimentation.

The control sand column was heated to 93.3° C. (200° F.) and treated with 2 pore volumes (100 ml) of 7% potassium chloride in water. Thereafter, a 7% KCl solution was pumped in reverse direction to simulate production of fluids at 50 ml/min, 100 ml/min, and 150 ml/min flow rates. Approximately 100 ml of effluents were collected at each flow rate to evaluate the migration of unconsolidated particulates from the control sand column. At 50 ml/min, few unconsolidated particulates were collected in the effluent. However, the effluent contained large amounts of unconsolidated particulates, such that the effluent was opaque, at 100 ml/min and 150 ml/min flow rates, indicating the migration of the unconsolidated particulates.

The experimental sand column was heated to 93.3° C. (200° F.) and treated with 2 pore volumes (100 ml) of 7% potassium chloride in water. Thereafter, 100 ml of a one-step acidizing treatment fluid was pumped in reverse direction. The one-step treatment fluid comprised a water base fluid, 10% hydrochloric acid formation stimulation agent, and a stabilizing emulsion comprising a water base fluid and 5% SANDWEDGE® ABC aqueous-based surface modification agent. The one-step acidizing treatment fluid further comprised 1% FDP-S1041 surfactant to aid in stabilizing the emulsion. Before pumping the one-step acidizing treatment fluid through the experimental sand column, it was heated to 65.6° C. (150° F.) for 20 min. Thereafter, the experimental sand column, treated with the one-step acidizing treatment fluid, was first flushed with 2 pore volumes (100 ml) of 7% KCl solution. Next, a 7% KCl solution was pumped in reverse direction to simulate production of fluids at 50 ml/min, 100 ml/min, 150 ml/min, 200 ml/min, and 300 ml/min flow rates. Approximately 100 ml of effluents were collected at each flow rate to evaluate the migration of unconsolidated particulates from the experimental sand column. At all flow rates, the effluents remained transparent or translucent, indicating that minimal unconsolidated particulates migrated from the experimental sand column after treatment with the one-step acidizing treatment fluid of the present invention, even at very high flow rates.

EXAMPLE 6

In this example, the effect of migration of unconsolidated particulates in the presence of the one-step acidizing treatment fluids of the present invention was evaluated. BRS having a particulate size of less than 200 mesh was used to simulate unconsolidated particulates and Brady 20/40 mesh sand was used to simulate a proppant pack. Twenty-two grams of the BRS and 44 grams of the Brady 20/40 mesh sand was mixed together and packed into a 12.7 cm (5 inch) long and 3.49 cm (1.375 inch) diameter brass cylinder, sandwiched between 66 grams of Brady 20/40 mesh sand on top and 66 grams of Brady 40/70 mesh sand on bottom. Two sand columns were prepared, one for use as a control and the other for experimentation.

The control sand column was heated to 93.3° C. (200° F.) and treated with 2 pore volumes (100 ml) of 7% potassium chloride in water. Thereafter, a 7% KCl was pumped in reverse direction to simulate production of fluids at 50 ml/min, 100 ml/min, and 150 ml/min flow rates. Approximately 100 ml of effluents were collected at each flow rate to evaluate the migration of unconsolidated particulates from the control sand column. At 50 ml/min, few unconsolidated particulates were collected in the effluent. However, the effluent contained large amounts of unconsolidated particulates, such that the effluent was opaque, at 100 ml/min and 150 ml/min flow rates, indicating the migration of the unconsolidated particulates.

The experimental sand column was heated to 93.3° C. (200° F.) and treated with 2 pore volumes (100 ml) of 7% potassium chloride in water. Thereafter, 100 ml of a one-step acidizing treatment fluid was pumped in reverse direction. The one-step treatment fluid comprised a 15% methylglycinediacetic acid formation stimulation agent, and a stabilizing emulsion comprising a water base fluid and 5% SANDWEDGE® ABC aqueous-based surface modification agent. The one-step acidizing treatment fluid further comprised 0.5% FDP-S1041 surfactant to aid in stabilizing the emulsion. Before pumping the one-step acidizing treatment fluid through the experimental sand column, it was heated to 65.6° C. (150° F.) for 20 min. Thereafter, the experimental sand column, treated with the one-step acidizing treatment fluid, was first flushed with 2 pore volumes (100 ml) of 7% KCl solution. Next, a 7% KCl solution was pumped in reverse direction to simulate production of fluids at 50 ml/min, 100 ml/min, 150 ml/min, 200 ml/min, and 300 ml/min flow rates. Approximately 100 ml of effluents were collected at each flow rate to evaluate the migration of unconsolidated particulates from the experimental sand column. At all flow rates, the effluents remained transparent, indicating that minimal unconsolidated particulates migrated from the experimental sand column after treatment with the one-step acidizing treatment fluid of the present invention, even at very high flow rates.

EXAMPLE 7

In this example, the effect of the one-step acidizing treatment fluid on formation permeability was examined. 100 ml of a one-step acidizing treatment fluid was prepared comprising a water base fluid, 10% hydrochloric acid formation stimulation agent, and a stabilizing emulsion comprising a water base fluid and 5% SANDWEDGE® ABC aqueous-based surface modification agent. The one-step acidizing treatment fluid further comprised 1% FDP-S1041 surfactant to aid in stabilizing the emulsion. A 2.54 cm×5.08 cm (1 in×2 in) Castlegate sandstone core was submerged into the one-step acidizing treatment and both were heated to 65.6° C. (150° F.) for 1 hour. Immediate bubbling was observed, indicating that the formation stimulation agent was reacting with the carbonate in the Castlegate sandstone core to generate carbon dioxide. After the 1 hour elapsed, the Castlegate sandstone core was removed from the one-step acidizing treatment fluid and submerged in water. Coal fines were added to the water and adhered to the surface of the Castlegate sandstone core, indicating that the one-step acidizing treatment fluid formed a tacky film on the surface of the Castlegate sandstone core.

Embodiments Disclosed Herein Include

A. A method of treating a subterranean formation comprising introducing into the subterranean formation a one-step acidizing treatment fluid comprising a first aqueous base fluid, a formation stimulation agent, and a stabilizing emulsion. The stabilizing emulsion is an aqueous external emulsion comprising a second aqueous base fluid, a surfactant, and an ASMA. The formation stimulation agent is contacted with the subterranean formation so as to acidize the formation and etch conductive channels therethrough. The stabilizing emulsion is contacted with the subterranean formation so as to release the ASMA and stabilize, or anchor in place, unconsolidated particles, thus preventing them from entering the newly formed channels within the formation.

B. A method of treating a proppant pack in a fracture in a subterranean formation comprising introducing into the subterranean formation a one-step acidizing treatment fluid comprising a first aqueous, a formation stimulation agent, and a stabilizing emulsion. The stabilizing emulsion is an aqueous external emulsion comprising a second aqueous base fluid, a surfactant, and an ASMA. The formation stimulation agent is contacted with the proppant pack in the fracture so as to acidize the proppant pack and create conductive channels therethrough. The stabilizing emulsion is contacted with the subterranean formation adjacent to the proppant pack or the proppant pack in the fracture so as to release the ASMA and stabilize, or anchor in place, unconsolidated particles, thus preventing them from entering the newly formed channels within the formation.

C. A method of acid fracturing a subterranean formation comprising introducing into the subterranean formation a one-step acidizing treatment fluid comprising a first aqueous, a formation stimulation agent, and a stabilizing emulsion at a rate and pressure sufficient to create or enhance at least one fracture therein. The stabilizing emulsion is an aqueous external emulsion comprising a second aqueous base fluid, a surfactant, and an ASMA. The formation stimulation agent is contacted with the subterranean formation adjacent to or within the fracture so as to acidize channels therethrough. The stabilizing emulsion is contacted with the subterranean formation adjacent to or within the fracture (e.g., the face of the fracture) so as to release the ASMA and stabilize, or anchor, unconsolidated particulates in place, thus preventing them from entering the newly formed channels adjacent to or within the fracture.

Each of embodiments A, B, and C may have one or more of the following additional elements in any combination:

Element 1: Wherein the formation stimulation agent is selected from the group consisting of hydrochloric acid; hydrofluoric acid; citric acid; formic acid; L-glutamic acid; N,N,-diacetic acid; ethylenediaminetetraacetic acid; hydroxyethylethylenediaminetriacetic acid; nitrilotriacetic acid; ethanoldiglycine disodium salt; diethylenetriaminpentaacetic acid; propylenediaminetetraacetic acid; ethylenediaminedi(o-hydroxyphenylacetic) acid; a sodium salt of L-glutamic acid; a sodium salt of N,N,-diacetic acid; a sodium salt of ethylenediaminetetraacetic acid; a sodium salt of hydroxyethylethylenediaminetriacetic acid; a sodium salt of nitrilotriacetic acid; a sodium salt of ethanoldiglycine disodium salt; a sodium salt of diethylenetriaminpentaacetic acid; a sodium salt of propylenediaminetetraacetic acid; a sodium salt of ethylenediaminedi(o-hydroxyphenylacetic) acid; a potassium salt of L-glutamic acid; a potassium salt of N,N,-diacetic acid; a potassium salt of ethylenediaminetetraacetic acid; a potassium salt of hydroxyethylethylenediaminetriacetic acid; a potassium salt of nitrilotriacetic acid; a potassium salt of ethanoldiglycine disodium salt; a potassium salt of diethylenetriaminpentaacetic acid; a potassium salt of propylenediaminetetraacetic acid; a potassium salt of ethylenediaminedi(o-hydroxyphenylacetic) acid; a dicarboxymethyl glutamic acid tetrasodium salt; a trisodium salt of methylglycinediacetic acid; any derivative thereof; and any combination thereof.

Element 2: Wherein the aqueous-based surface modification agent is selected from the group consisting of a polyamide; a polyester; a polycarbonate; a natural resin; a zeta-potential reducing agent; and any combination thereof.

Element 3: Wherein the one-step acidizing treatment fluid further comprises a corrosion inhibitor; a scale inhibitor; and any combination thereof.

Element 4: Wherein the aqueous-based surface modification agent is present in an amount in the range of from about 0.01% to about 10% by weight of the one-step acidizing treatment fluid.

Element 5: Wherein the formation stimulation agent is present in the range of from about 0.1% to about 20% by weight of the one-step acidizing treatment fluid.

Element 6: Wherein the stabilizing emulsion is contacted with the with the subterranean formation so as to release the aqueous-based surface modification agent and stabilize unconsolidated formation particulates therein.

Element 7: Wherein the surfactant is present in an amount in the range of from about 0.01% to about 10% by weight of the stabilizing emulsion.

By way of non-limiting example, exemplary combinations applicable to A, B, and C include: A with 7; A with 1 and 3; B with 5, 6, and 7; and C with 1, 2, 3, and 4.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method of treating a subterranean formation comprising:
   providing a one-step acidizing treatment fluid comprising a first aqueous base fluid, a formation stimulation agent, and a stabilizing emulsion,
      wherein the stabilizing emulsion is an aqueous external emulsion comprising a second aqueous base fluid, a surfactant, and a surface modification agent;
   introducing the one-step acidizing treatment fluid into the subterranean formation;
   contacting the formation stimulation agent with the subterranean formation so as to acidize the subterranean formation and create conductive channels therethrough; and
   contacting the stabilizing emulsion with the subterranean formation so as to release the surface modification agent and stabilize unconsolidated formation particulates therein,
      wherein the formation stimulation agent acidizes the subterranean formation prior to the stabilizing emulsion releasing the surface modification agent.

2. The method of claim 1, wherein the formation stimulation agent is selected from the group consisting of hydrochloric acid;
   hydrofluoric acid; citric acid; formic acid; L-glutamic acid; N, N,-diacetic acid;
   ethylenediaminetetraacetic acid; hydroxyethylethylenediaminetriacetic acid;
   nitrilotriacetic acid; ethanoldiglycine disodium salt; diethylenetriaminpentaacetic acid; propylenediaminetetraacetic acid; ethylenediaminedi(o-hydroxyphenylacetic) acid; a sodium salt of L-glutamic acid; a sodium salt of N, N,-diacetic acid; a sodium salt of ethylenediaminetetraacetic acid; a sodium salt of hydroxyethylethylenediaminetriacetic acid; a sodium salt of nitrilotriacetic acid; a sodium salt of diethylenetriaminpentaacetic acid; a sodium salt of propylenediaminetetraacetic acid; a sodium salt of ethylenediaminedi(o-hydroxyphenylacetic) acid; a potassium salt of L-glutamic acid; a potassium salt of N, N,-diacetic acid; a potassium salt of ethylenediaminetetraacetic acid; a potassium salt of hydroxyethylethylenediaminetriacetic acid; a potassium salt of nitrilotriacetic acid; a potassium salt of diethylenetriaminpentaacetic acid; a potassium salt of propylenediaminetetraacetic acid; a potassium salt of ethylenediaminedi(o-hydroxyphenylacetic) acid; a dicarboxymethyl glutamic acid tetrasodium salt; a trisodium salt of methylglycinediacetic acid; any derivative thereof; and any combination thereof.

3. The method of claim 1, wherein the surface modification agent is selected from the group consisting of a polyamide; a polyester; a polycarbonate; a natural resin; a zeta-potential reducing agent; and any combination thereof.

4. The method of claim 1, wherein the one-step acidizing treatment fluid further comprises an additive selected from the group consisting of a corrosion inhibitor; a scale inhibitor; and any combination thereof.

5. The method of claim 1, wherein the surface modification agent is present in an amount in the range of from about 0.01% to about 10% by weight of the one-step acidizing treatment fluid.

6. The method of claim 1, wherein the formation stimulation agent is present in the range of from about 0.1% to about 20% by weight of the one-step acidizing treatment fluid.

7. A method of treating a proppant pack in a fracture in a subterranean formation comprising:
providing a one-step acidizing treatment fluid comprising a first aqueous base fluid, a formation stimulation agent, and a stabilizing emulsion,
wherein the stabilizing emulsion is an aqueous external emulsion comprising a second aqueous base fluid, a surfactant, and surface modification agent;
introducing the one-step acidizing treatment fluid into the subterranean formation;
contacting the formation stimulation agent with the proppant pack so as to acidize the proppant pack and create conductive channels therethrough; and
contacting the stabilizing emulsion with the subterranean formation adjacent to the proppant pack or within the proppant pack so as to release the surface modification agent and stabilize unconsolidated formation particulates adjacent to or within the proppant pack.

8. The method of claim 7, further comprising contacting the stabilizing emulsion with the subterranean formation adjacent to or within the fracture so as to release the surface modification agent and stabilize unconsolidated formation particulates therein.

9. The method of claim 7, wherein the formation stimulation agent is selected from the group consisting of hydrochloric acid;
hydrofluoric acid; citric acid; formic acid; L-glutamic acid; N, N,-diacetic acid;
ethylenediaminetetraacetic acid; hydroxyethylethylenediaminetriacetic acid;
nitrilotriacetic acid; ethanoldiglycine disodium salt; diethylenetriaminpentaacetic acid; propylenediaminetetraacetic acid; ethylenediaminedi(o-hydroxyphenylacetic) acid; a sodium salt of L-glutamic acid; a sodium salt of N, N,-diacetic acid; a sodium salt of ethylenediaminetetraacetic acid; a sodium salt of hydroxyethylethylenediaminetriacetic acid; a sodium salt of nitrilotriacetic acid; a sodium salt of diethylenetriaminpentaacetic acid; a sodium salt of propylenediaminetetraacetic acid; a sodium salt of ethylenediaminedi(o-hydroxyphenylacetic) acid; a potassium salt of L-glutamic acid; a potassium salt of N, N,-diacetic acid; a potassium salt of ethylenediaminetetraacetic acid; a potassium salt of hydroxyethylethylenediaminetriacetic acid; a potassium salt of nitrilotriacetic acid; a potassium salt of diethylenetriaminpentaacetic acid; a potassium salt of propylenediaminetetraacetic acid; a potassium salt of ethylenediaminedi(o-hydroxyphenylacetic) acid; a dicarboxymethyl glutamic acid tetrasodium salt; a trisodium salt of methylglycinediacetic acid; any derivative thereof; and any combination thereof.

10. The method of claim 7, wherein the surface modification agent is selected from the group consisting of a polyamide; a polyester; a polycarbonate; a natural resin; a zeta-potential reducing agent; and any combination thereof.

11. The method of claim 7, wherein the one-step acidizing treatment fluid further comprises an additive selected from the group consisting of a corrosion inhibitor; a scale inhibitor; and any combination thereof.

12. The method of claim 7, wherein the surface modification agent is present in an amount in the range of from about 0.01% to about 10% by weight of the one-step acidizing treatment fluid.

13. The method of claim 7, wherein the formation stimulation agent is present in the range of from about 0.1% to about 20% by weight of the one-step acidizing treatment fluid.

14. A method of acid fracturing a subterranean formation comprising:
providing a one-step acidizing treatment fluid comprising a first aqueous base fluid, a formation stimulation agent, and a stabilizing emulsion,
wherein the stabilizing emulsion is an aqueous external emulsion comprising a second aqueous base fluid, a surfactant, and a surface modification agent;
introducing the one-step acidizing treatment fluid into the subterranean formation at a rate and pressure sufficient to create or enhance at least one fracture therein;
contacting the formation stimulation agent with the subterranean formation adjacent to or within the at least one fracture so as to acidize the subterranean formation and create conductive channels therethrough; and
contacting the stabilizing emulsion with the subterranean formation adjacent to or within the at least one fracture so as to release the surface modification agent and stabilize unconsolidated formation particulates therein.

15. The method of claim 14, wherein the formation stimulation agent is selected from the group consisting of hydrochloric acid; hydrofluoric acid; citric acid; formic acid; L-glutamic acid; N, N,-diacetic acid; ethylenediaminetetraacetic acid; hydroxyethylethylenediaminetriacetic acid;
nitrilotriacetic acid; ethanoldiglycine disodium salt; diethylenetriaminpentaacetic acid; propylenediaminetetraacetic acid; ethylenediaminedi(o-hydroxyphenylacetic) acid; a sodium salt of L-glutamic acid; a sodium salt of N, N,-diacetic acid; a sodium salt of ethylenediaminetetraacetic acid; a sodium salt of hydroxyethylethylenediaminetriacetic acid; a sodium salt of nitrilotriacetic acid; a sodium salt of diethylenetriaminpentaacetic acid; a sodium salt of propylenediaminetetraacetic acid; a sodium salt of ethylenediaminedi(o-hydroxyphenylacetic) acid; a potassium salt of L-glutamic acid; a potassium salt of N, N,-diacetic acid; a potassium salt of ethylenediaminetetraacetic acid; a potassium salt of hydroxyethylethylenediaminetriacetic acid; a potassium salt of nitrilotriacetic acid; a potassium salt of diethylenetriaminpentaacetic acid; a potassium salt of propylenediaminetetraacetic acid; a potassium salt of ethylenediaminedi(o-hydroxyphenylacetic) acid; a dicarboxymethyl glutamic acid tetrasodium salt; a trisodium salt of methylglycinediacetic acid; any derivative thereof; and any combination thereof.

16. The method of claim 14, wherein the surface modification agent is selected from the group consisting of a polyamide; a polyester; a polycarbonate; a natural resin; a zeta-potential reducing agent; and any combination thereof.

17. The method of claim 14, wherein the one-step acidizing treatment fluid further comprises an additive selected from the group consisting of a corrosion inhibitor; a scale inhibitor; and any combination thereof.

18. The method of claim 14, wherein the surface modification agent is present in an amount in the range of from about 0.01% to about 10% by weight of the one-step acidizing treatment fluid.

19. The method of claim 14, wherein the formation stimulation agent is present in the range of from about 0.1% to about 20% by weight of the one-step acidizing treatment fluid.

* * * * *